(12) United States Patent
Takizawa

(10) Patent No.: US 10,837,572 B2
(45) Date of Patent: Nov. 17, 2020

(54) POWER TRANSMISSION MECHANISM, ACTUATOR, AND VEHICLE ACTUATOR

(71) Applicant: Mitsuba Corporation, Gunma (JP)

(72) Inventor: Takashi Takizawa, Kiryu (JP)

(73) Assignee: Mitsuba Corporation, Gunma (JP)

( * ) Notice: Subject to any disclaimer, the term of this patent is extended or adjusted under 35 U.S.C. 154(b) by 3 days.

(21) Appl. No.: 16/332,223

(22) PCT Filed: Oct. 2, 2017

(86) PCT No.: PCT/JP2017/035850
§ 371 (c)(1),
(2) Date: Mar. 11, 2019

(87) PCT Pub. No.: WO2018/066523
PCT Pub. Date: Apr. 12, 2018

(65) Prior Publication Data
US 2019/0271405 A1    Sep. 5, 2019

(30) Foreign Application Priority Data

Oct. 3, 2016 (JP) ................................. 2016-195635

(51) Int. Cl.
*F16K 31/04* (2006.01)
*B60K 17/02* (2006.01)
(Continued)

(52) U.S. Cl.
CPC .............. *F16K 31/045* (2013.01); *B60J 5/10* (2013.01); *B60K 17/02* (2013.01); *B60K 17/043* (2013.01);
(Continued)

(58) Field of Classification Search
CPC .......... F16K 31/045; E05F 15/611; B60J 5/10; B60K 17/02; B60K 17/043; F16D 7/02; F16D 13/08
See application file for complete search history.

(56) References Cited

U.S. PATENT DOCUMENTS

| | | | |
|---|---|---|---|
| 5,832,779 A | * | 11/1998 | Madrid .................. F16H 25/20 74/89.39 |
| 2006/0243075 A1 | * | 11/2006 | Liou .................. F16H 25/2454 74/89.39 |

(Continued)

FOREIGN PATENT DOCUMENTS

| JP | 0700445 A | 1/1995 |
|---|---|---|
| JP | 2003253960 A | 9/2003 |

(Continued)

OTHER PUBLICATIONS

Japanese Patent Office, Notice of Allowance issued in JP 2016-195635 dated Nov. 12, 2019, 6 pages.

(Continued)

*Primary Examiner* — Zakaria Elahmadi
(74) *Attorney, Agent, or Firm* — Wood Herron & Evans LLP

(57) ABSTRACT

A torque limiter (120) includes a coil spring (124), an inner shaft which is connected to a drive shaft (58) and is disposed to be inserted into a coil portion of the coil spring (124) so that the coil portion of the coil spring (124) is configured to come into close contact with an outer peripheral surface, a bottomed cylindrical outer member (122) which is disposed at the outside of the coil portion with a gap interposed therebetween and is provided relatively rotatable with respect to the inner shaft so that both end portions of a wire forming the coil spring (124) are locked thereto, and a drive gear (123) which is integrally formed with a plate portion (Continued)

(122a) of the outer member (122) and is configured to transmit a rotational force to the screw shaft.

5 Claims, 9 Drawing Sheets

(51) Int. Cl.
| | | |
|---|---|---|
| *B60K 17/04* | (2006.01) | |
| *E05F 15/611* | (2015.01) | |
| *F16D 13/08* | (2006.01) | |
| *F16D 7/02* | (2006.01) | |
| *B60J 5/10* | (2006.01) | |

(52) U.S. Cl.
CPC .............. *E05F 15/611* (2015.01); *F16D 7/02* (2013.01); *F16D 13/08* (2013.01)

(56) References Cited

U.S. PATENT DOCUMENTS

| | | | | |
|---|---|---|---|---|
| 2008/0268964 A1* | 10/2008 | Kim | ...................... | F16D 41/206 464/47 |
| 2011/0048147 A1* | 3/2011 | Keech | ................... | B64C 13/341 74/89.26 |
| 2011/0167651 A1* | 7/2011 | Tokunaga | .............. | B23D 47/12 30/388 |
| 2013/0024076 A1* | 1/2013 | Fukui | .................... | E05F 15/622 701/49 |
| 2013/0084106 A1* | 4/2013 | Tsuda | ................. | G03G 21/1821 399/258 |
| 2014/0260733 A1* | 9/2014 | Goncalves | .......... | F16H 25/2021 74/89.38 |
| 2015/0211279 A1* | 7/2015 | Suzuki | ..................... | H02K 7/10 16/65 |
| 2015/0276031 A1* | 10/2015 | Suzuki | ...................... | E05F 5/00 74/89.39 |
| 2016/0144694 A1* | 5/2016 | Shchokin | .............. | F16H 57/082 296/146.4 |
| 2016/0230814 A1* | 8/2016 | Schumann | .............. | F16D 13/08 |
| 2016/0288547 A1* | 10/2016 | Aoki | ......................... | B41J 13/03 |
| 2016/0312514 A1* | 10/2016 | Leonard | ............ | F16H 25/2454 |
| 2017/0044814 A1* | 2/2017 | Scheuring | .............. | H02K 7/116 |
| 2019/0032387 A1* | 1/2019 | Wolker | ................. | E05F 15/614 |
| 2019/0211604 A1* | 7/2019 | Scheuring | ............... | E05F 15/70 |
| 2019/0344822 A1* | 11/2019 | Wou | ..................... | B62D 5/0424 |
| 2019/0363602 A1* | 11/2019 | Oberndorfer | ............ | H02K 5/10 |

FOREIGN PATENT DOCUMENTS

| | | |
|---|---|---|
| JP | 2003278790 A | 10/2003 |
| JP | 2007046637 A | 2/2007 |
| JP | 2008274979 A | 11/2008 |
| JP | 2010151254 A | 7/2010 |
| JP | 2014100956 A | 6/2014 |
| JP | 2016176585 A | 10/2016 |

OTHER PUBLICATIONS

PCT Office, International Search Report issued in PCT/JP2017/035850 dated Dec. 19, 2017, 4 pages.

\* cited by examiner

POWER TRANSMISSION MECHANISM, ACTUATOR, AND VEHICLE ACTUATOR

TECHNICAL FIELD

The present invention relates to a power transmission mechanism, an actuator, and a vehicle actuator used to open and close, for example, a tailgate or the like of an automobile.

Priority is claimed on Japanese Patent Application No. 2016-195635, filed Oct. 3, 2016, the content of which is incorporated herein by reference.

BACKGROUND ART

Conventionally, for a vehicle door opening and closing mechanism, a configuration is known in which an actuator (a support member) is provided between a periphery of a vehicle body side opening portion and a tailgate (a back door) provided in the opening portion in an openable and closeable manner in order to open and close the tailgate while being driven in an axial direction in a telescopic manner (for example, see Patent Document 1).

Such an actuator includes a first housing which has a cylindrical shape, a second housing which has a diameter larger than that of the first housing and into which the first housing is inserted, a motor portion (a motor) which is provided inside the first housing, a screw spindle which is connected to the motor portion through a decelerator and is disposed to be coaxial to the motor portion, a spindle nut which is fixed to the second housing and is threaded into the screw spindle, and a compression coil spring which is accommodated in the second housing and biases the first housing and the second housing in an extension direction.

Under such a configuration, when the motor portion of the actuator is rotationally driven, the rotation of an output shaft of the motor portion is transmitted to the screw spindle through the decelerator so that the screw spindle rotates. With the rotation of the screw spindle, the spindle nut which is threaded into the screw spindle moves in the axial direction of the screw spindle. Accordingly, the second housing protrudes and retracts with respect to the first housing and the actuator moves in a telescopic manner.

CITATION LIST

Patent Literature

[Patent Document 1]
Japanese Unexamined Patent Application, First Publication No. 2014-100956

SUMMARY OF INVENTION

Technical Problem

Incidentally, in the above-described actuator, an excessive force is input from the tailgate to the actuator when the tailgate is swiftly opened and closed. Then, there is a possibility that the decelerator of the actuator, an engagement portion between the decelerator and the screw spindle, or a connection portion between the actuator and the tailgate or the vehicle body may be deformed or damaged.

In order to provide a strength capable of withstanding such an excessive input, components of each part increase in size, cost, and weight.

An object of the present invention is to provide a power transmission mechanism, an actuator, and a vehicle actuator capable of improving performance in response to an excessive input and preventing an increase in the size, cost, and weight of components.

Solution to Problem

The present invention employs the following means in order to solve the above-described problems.

That is, according to a first aspect of the present invention, provided is a power transmission mechanism which is interposed between a motor rotating a drive shaft and a driven shaft rotationally driven by the transmission of the rotation of the drive shaft, including: a coil spring; an inner shaft which is connected to the drive shaft and is disposed to be inserted into a coil portion of a coil spring so that the coil portion of the coil spring is configured to come into close contact with an outer peripheral surface thereof; a bottomed cylindrical outer member that is disposed at the outside of the coil portion with a gap interposed therebetween and is provided to be relatively rotatable with respect to the inner shaft so that both end portions of a wire forming the coil spring are locked thereto; and a drive gear which is integrally formed with a bottom portion of the outer member and is configured to transmit a rotational force to the driven shaft, wherein when a torque equal to or larger than a predetermined torque value is applied from the outer member to the coil portion by an external force input from the driven shaft, the coil portion of the coil spring becomes loosened in a direction in which an inner diameter of the coil portion is enlarged.

According to such a configuration, when the drive shaft is rotated by the motor, the rotation of the drive shaft is transmitted to the outer member to which both end portions of the wire of the coil spring are locked through the coil spring since the inner shaft is configured to come into close contact with the coil portion of the coil spring. Accordingly, when the drive shaft rotates, the drive gear rotates together with the outer member so that a rotational force is transmitted to the driven shaft.

When a force is applied in a direction opposite to the rotation direction of the motor from the driven shaft, a relative rotation is about to occur between the inner shaft connected to the drive shaft of the motor and the outer member connected to the driven shaft through the drive gear. When a torque acting on the coil portion of the coil spring becomes equal to or larger than a predetermined torque value determined by the elastic modulus or the like of the coil spring due to the relative rotation, the coil portion is loosened in a direction in which the inner diameter is enlarged. In this way, when the coil portion is enlarged outward in the radial direction, the coil portion is separated from the inner shaft. As a result, a rotational force is not transmitted between the coil portion and the inner shaft rotating together with the drive shaft of the motor and slippage occurs so that the power transmission mechanism functions as a so-called torque limiter. Accordingly, it is possible to interrupt the transmission of the input force to the motor when an excessive force is input from the driven shaft.

In such a configuration, since the drive gear is integrally formed with the outer member, a member or the like for connecting the drive gear and the outer member is not necessary.

Further, according to a second aspect of the present invention, provided is an actuator including: the power transmission mechanism according to the first aspect of the present invention; the motor which is configured to rotate the drive shaft; the driven shaft which is rotationally driven by the transmission of the rotation of the drive shaft; and a following member that is configured to move in an axial direction of the driven shaft with the rotation of the driven shaft.

According to such a configuration, when the drive shaft is rotated by the motor, the rotational force is transmitted to the driven shaft through the inner shaft, the coil spring, the outer member, and the drive gear so that the following member moves in the axial direction of the driven shaft.

Further, in such a configuration, when an excessive force is applied from the following member in a direction in which the rotation of the motor is stopped, the coil portion is enlarged outward in the radial direction and is separated from the inner shaft so that a rotational force is not transmitted between the inner shaft and the coil portion. Accordingly, it is possible to interrupt the transmission of the input force to the motor when an excessive force is input from the following member.

Further, according to a third aspect of the present invention, the actuator according to the second aspect of the present invention may further include: a fixed housing which is formed in a cylindrical shape and accommodates the driven shaft; and a movable housing which has an outer diameter smaller than an inner diameter of the fixed housing, is inserted into the fixed housing, and is provided in a protruding and retracting direction from the fixed housing with the movement of the following member.

According to such a configuration, it is possible to interrupt the transmission of an input force to the motor when there is an excessive input from a target driven by the actuator.

Further, according to a fourth aspect of the present invention, the actuator according to the third aspect of the present invention may have a configuration in which the motor is disposed in parallel to the fixed housing and the movable housing.

According to such a configuration, it is possible to shorten the entire length of the actuator as compared with a case in which the motor is disposed in series to the fixed housing and the movable housing.

Further, according to a fifth aspect of the present invention, the actuator according to the fourth aspect of the present invention may further include a casing which integrally includes a motor housing accommodating the motor, the fixed housing, and a base plate connected to a base end portion of the motor housing and a base end portion of the fixed housing.

According to such a configuration, since the motor housing and the fixed housing are integrated through the base plate, it is possible to decrease the number of components.

Further, according to a sixth aspect of the present invention, the actuator according to the fifth aspect of the present invention may further include the drive gear; a driven gear which is provided in the driven shaft; and an intermediate gear which is provided between the drive gear and the driven gear, wherein the drive gear, the driven gear, and the intermediate gear may be disposed in the base plate to be located at a position opposite to the motor housing and the fixed housing.

According to such a configuration, it is possible to rotate the driven shaft by transmitting the rotation of the drive gear driven by the motor to the driven gear through the intermediate gear. Further, since the intermediate gear is interposed between the drive gear and the driven gear, it is possible to decrease the diameters of the drive gear and the driven gear as compared with a case in which the drive gear directly engages with the driven gear.

Further, according to a seventh aspect of the present invention, the actuator according to the sixth aspect of the present invention may further include a sensor magnet which is provided in at least one of the outer member, the drive gear, the intermediate gear, the driven gear, and the driven shaft; and a sensor element which is configured to detect a change in magnetic flux of the sensor magnet.

According to such a configuration, the sensor magnet and the sensor element are provided near the driven shaft in relation to the coil spring that enables and disables the transmission of the torque between the motor and the driven shaft. For this reason, it is possible to detect the rotation amount of the driven shaft even when the coil portion of the coil spring is enlarged by an excessive input from the driven shaft so that slippage occurs between the inner shaft and the outer member. Thus, it is possible to recognize the movement amount of the driving target driven by the driven shaft. Thus, it is possible to continuously drive the driving target from a state before slippage occurs after an excessive input is cancelled.

Further, according to an eighth aspect of the present invention, the actuator according to the seventh aspect of the present invention may have a configuration in which the sensor magnet is provided in the intermediate gear and the sensor element is disposed at the outside of the intermediate gear in a radial direction.

According to such a configuration, it is possible to prevent the sensor element from interfering with the drive shaft of the motor connected to the drive gear or the driven shaft connected to the driven gear. Accordingly, it is possible to prevent an increase in the size of the actuator by providing the sensor element.

Further, according to a ninth aspect of the present invention, the actuator according to the eighth aspect of the present invention may further include a cover which is provided at a position opposite to the motor housing and the fixed housing in the base plate and covers the drive gear, the driven gear, and the intermediate gear, wherein the cover includes a gear accommodation concave portion which accommodates the drive gear, the driven gear, and the intermediate gear and a sensor accommodation portion which accommodates the sensor element, and wherein the gear accommodation concave portion and the sensor accommodation portion are opened in the same direction.

According to such a configuration, when the gear accommodation concave portion accommodates the drive gear, the driven gear, and the intermediate gear and the sensor accommodation portion accommodates the sensor element in the cover, the drive gear, the driven gear, and the intermediate gear can be assembled in the same direction as that of the sensor element. Thus, the workability and assembling workability can be improved.

Further, according to a tenth aspect of the present invention, provided is a vehicle actuator including the actuator according to any one of the second aspect to the ninth aspect of the present invention which is mounted on a vehicle and opens and closes an opening and closing member provided in an opening portion formed in the vehicle to be openable and closeable.

According to such a configuration, since the coil portion of the coil spring is enlarged so that slippage occurs when there is an excessive input from the opening and closing member, it is possible to prevent an excessive force from being exerted on the actuator or the vehicle body to which the actuator is attached.

Advantageous Effects of Invention

According to the power transmission mechanism, the actuator, and the vehicle actuator, it is possible to improve performance in response to an excessive input and to prevent an increase in the size, cost, and weight of components.

DESCRIPTION OF EMBODIMENTS

Next, an actuator and a vehicle actuator according to an embodiment of the present invention will be described with reference to the drawings.

Figure 1:
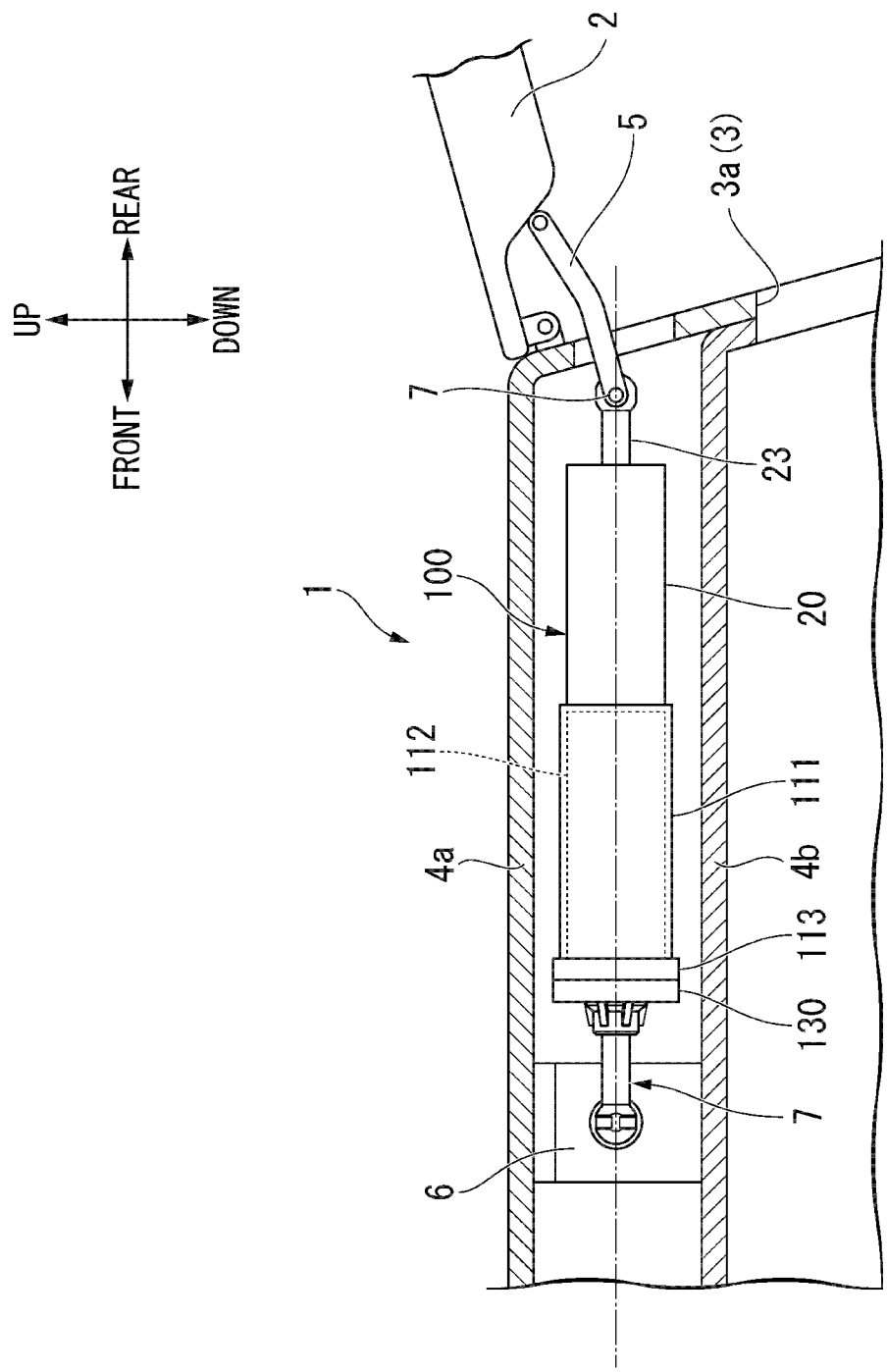
FIG. 1 is a longitudinal sectional view of a vehicle body of an automobile including an actuator of an embodiment of the present invention.

FIG. 1 is a longitudinal sectional view of a vehicle body 1 of an automobile including an actuator 100 of the embodiment of the present invention. Furthermore, in the following description, the front and rear sides of the vehicle body 1 in the traveling direction will be simply referred to as the front to rear direction, the front side in the traveling direction will be simply referred to as the front side, the rear side in the traveling direction will be simply referred to as the rear side, the upside in the direction of gravity will be simply referred to as the upside, the downside in the direction of gravity will be simply referred to as the downside, and the vehicle width direction of the vehicle body 1 will be referred to as the left to right direction. In FIG. 1, the left direction becomes the front direction and the right direction becomes the rear direction.

(Actuator)

As shown in the same drawing, an actuator (a vehicle actuator) 100 is used to open and close a tailgate (an opening and closing member) 2 provided at the rear part of the vehicle body 1. The actuator 100 is disposed at each of both sides of an opening portion 3 formed at the rear part of the vehicle body 1.

The actuator 100 is provided between a roof outer panel 4a and a roof inner panel 4b constituting a ceiling of the vehicle body 1. The tailgate 2 is provided in the opening portion 3 provided at the rear part of the vehicle body 1 to be openable and closeable through a hinge mechanism 5 provided at an upper portion 3a of the opening portion 3.

A first end of the actuator 100 is connected to a bracket 6 provided between the roof outer panel 4a and the roof inner panel 4b and a second end thereof is connected to the hinge mechanism 5 through a pin 7 provided in the tailgate 2.

Figure 2:
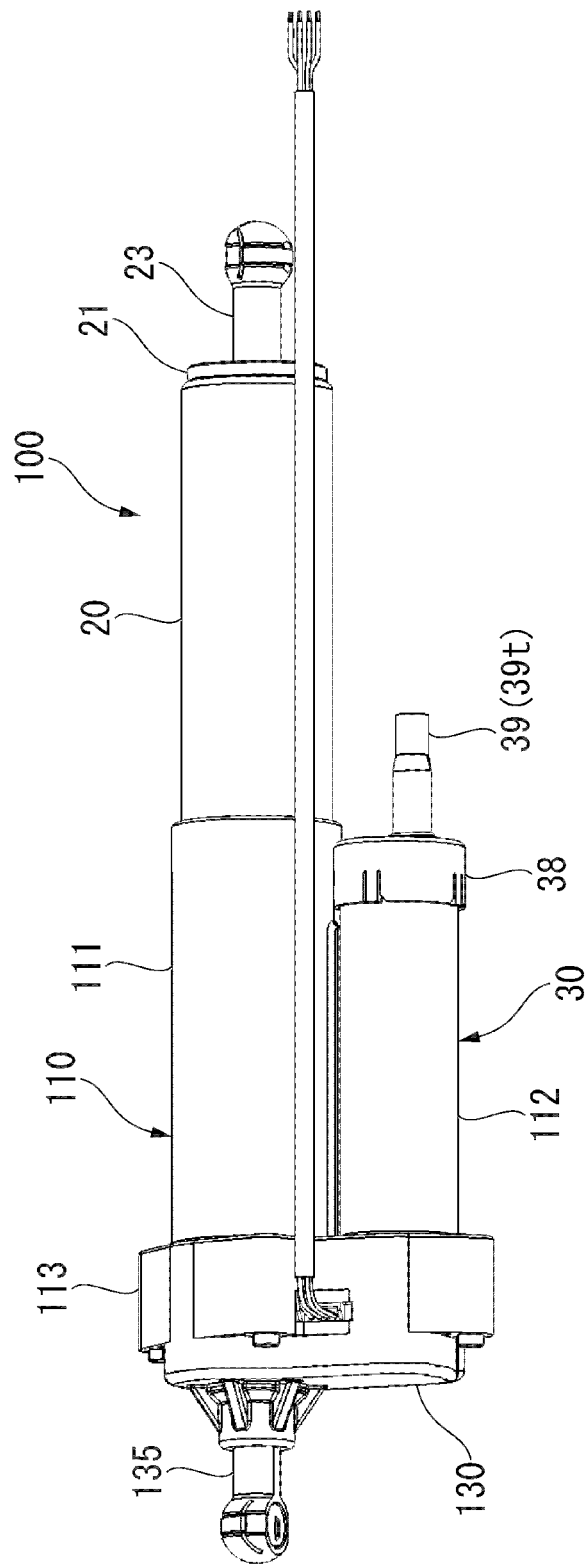
FIG. 2 is a perspective view showing an appearance of the actuator of the embodiment of the present invention.
Figure 3:
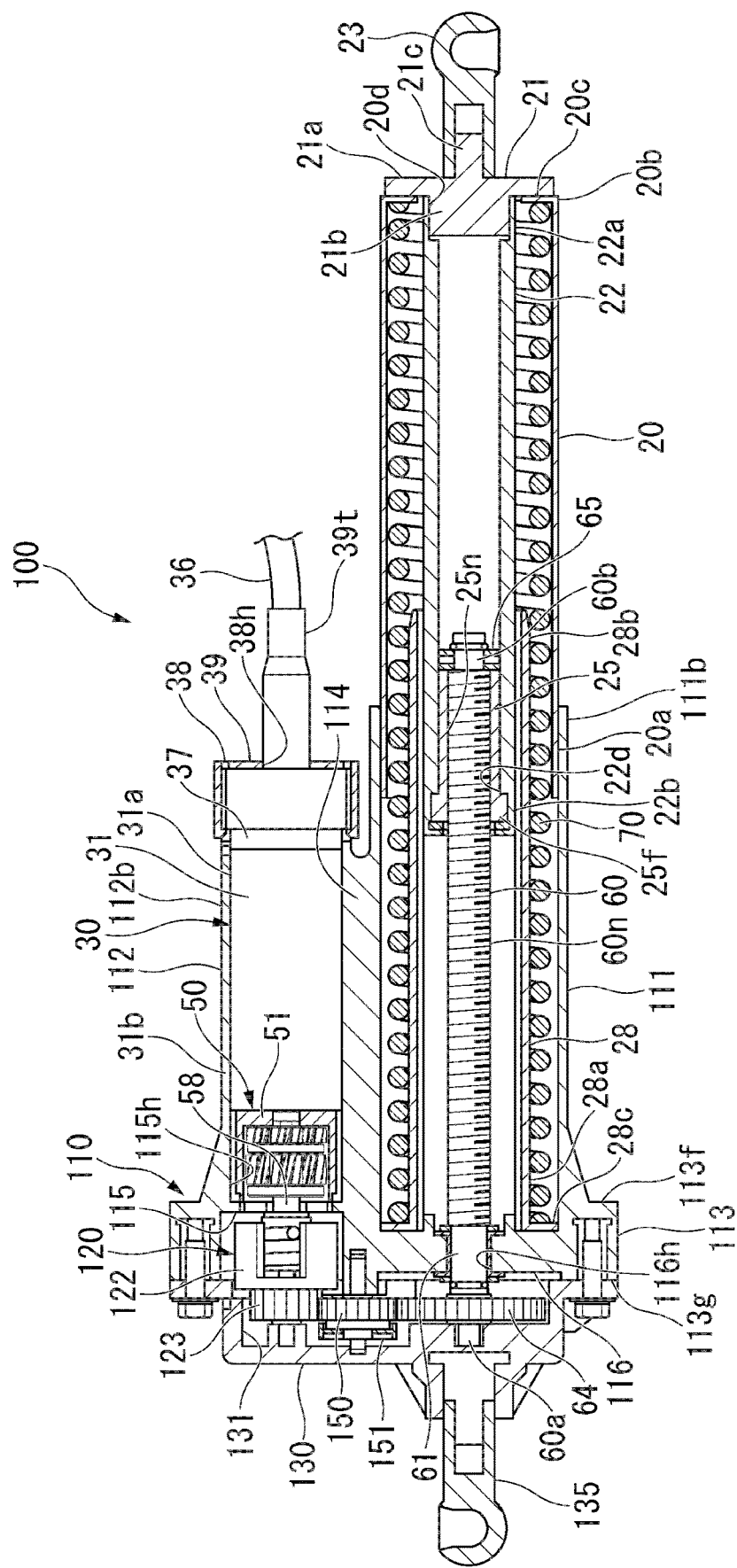
FIG. 3 is a cross-sectional view showing an internal structure of the actuator of the embodiment of the present invention.

FIG. 2 is a perspective view showing an appearance of the actuator 100. FIG. 3 is a cross-sectional view showing an internal structure of the actuator 100.

As shown in FIGS. 2 and 3, the actuator 100 includes a casing 110 which includes a rod-side fixed housing (a fixed housing) 111 and a motor housing 112 disposed in parallel, a rod-side movable housing (a movable housing) 20 which is provided in the rod-side fixed housing 111 to be able to protrude and retract, a screw shaft (a driven shaft) 60 and a coil spring 70 which are accommodated in the rod-side fixed housing 111 and the rod-side movable housing 20, a motor portion (a motor) 30 which is accommodated in the motor housing 112, a reduction gear portion 50 to which power of the motor portion 30 is transmitted and from which power is output, a torque limiter (a power transmission mechanism) 120 which is provided between the motor portion 30 and the reduction gear portion 50, and a gear casing (a cover) 130 which accommodates the reduction gear portion 50.

(Casing)

Figure 4:
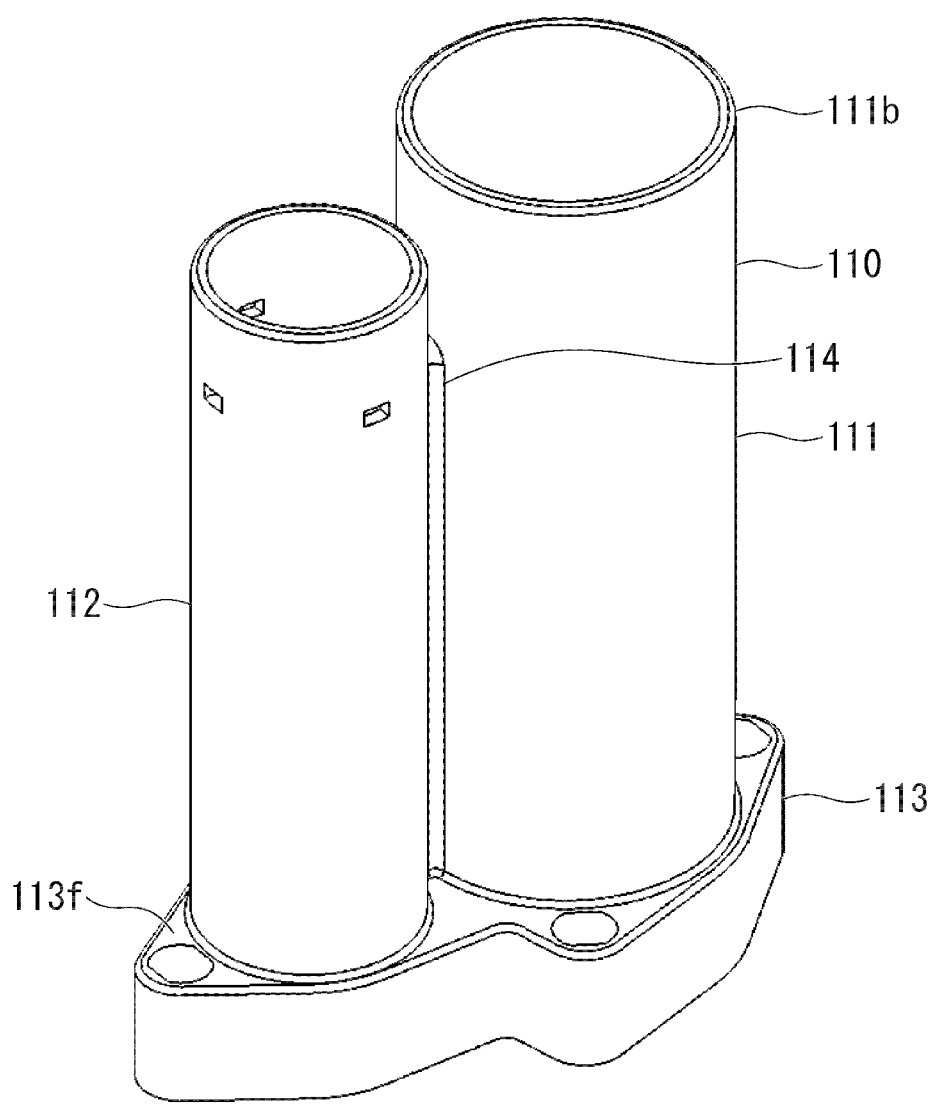
FIG. 4 is a perspective view showing an appearance of a casing of the embodiment of the present invention.

FIG. 4 is a perspective view showing an appearance of the casing of the embodiment of the present invention.

As shown in the same drawing, the casing 110 is formed of a metal material such as iron and integrally includes the rod-side fixed housing 111, the motor housing 112, and a base plate (a connection plate) 113 which is provided at first ends of the rod-side fixed housing 111 and the motor housing 112.

The rod-side fixed housing 111 is formed in a substantially cylindrical shape and extends in a direction orthogonal to a front surface 113f of the base plate 113.

The motor housing 112 is also formed in a substantially cylindrical shape. The motor housing 112 extends from the front surface 113f of the base plate 113 in an orthogonal direction in parallel to the rod-side fixed housing 11. More specifically, the motor housing 112 is disposed in parallel to the rod-side fixed housing 111 with a gap therebetween in a direction orthogonal to the center axes of the rod-side fixed housing 111 and the motor housing 112.

The outer peripheral surface of the rod-side fixed housing 111 and the outer peripheral surface of the motor housing 112 are integrally connected to each other by a housing connection portion 114 formed therebetween. The housing connection portion 114 continuously connects the outer peripheral surface of the motor housing 112 and the outer peripheral surface of the rod-side fixed housing 111 in the axial direction of a drive shaft 58.

As shown in FIG. 3, a joint surface 113g opposite to the front surface 113f of the base plate 113 is provided with a torque limiter accommodation concave portion 115 and a rod-side concave portion 116. The torque limiter accommodation concave portion 115 and the rod-side concave portion 116 are formed to be recessed from the joint surface 113g toward the front surface 113f.

Further, a bottom surface of the torque limiter accommodation concave portion 115 is provided with a shaft insertion hole 115h which communicates with the front surface 113f and the joint surface 113g. A bottom surface of the rod-side concave portion 116 is provided with a shaft insertion hole 116h which communicates with the front surface 113f and the joint surface 113g.

(Rod-Side Movable Housing)

The rod-side movable housing 20 is formed in a substantially cylindrical shape which has an outer diameter smaller than the inner diameter of the rod-side fixed housing 111. The rod-side movable housing 20 is formed of, for example, a material such as aluminum alloy and resin softer than the rod-side fixed housing 111.

Further, a first end 20a of the rod-side movable housing 20 is inserted from a front end portion 111b of the rod-side fixed housing 111 into the rod-side fixed housing 111. The rod-side movable housing 20 is relatively movable with respect to the rod-side fixed housing 111 in a direction to protrude from and retract into the front end portion 111b.

The second end 20b of the rod-side movable housing 20 is provided with a bottom portion 20c by deep drawing or the like. A center of the bottom portion 20c in the radial direction is provided with a through-hole 20d through which a joint portion 21c of a joint member 21 to be described later is insertable.

Further, the second end 20b of the rod-side movable housing 20 is provided with the joint member 21 and an inner tube 22.

The joint member 21 is formed of, for example, a metal material such as iron or aluminum alloy and is disposed at the outside of the rod-side movable housing 20. The joint member 21 integrally includes a plate portion 21a, a boss portion 21b, and a joint portion 21c.

The plate portion 21a is formed in a substantially disk shape and is provided along the bottom portion 20c of the rod-side movable housing 20. The boss portion 21b is formed in a columnar shape and protrudes toward the inside of the rod-side movable housing 20 while passing through the through-hole 20d formed in the bottom portion 20c from the plate portion 21a. The joint portion 21c protrudes from the plate portion 21a toward the side opposite to the boss portion 21b. A joint member 23 that is connected to the hinge mechanism 5 through the pin 7 (see FIG. 1) is threaded into the joint portion 21c.

The inner tube 22 is formed of, for example, a metal material such as iron and aluminum alloy and is disposed at the inside of the rod-side movable housing 20. A first end 22a of the inner tube 22 is butted against the bottom portion 20c of the rod-side movable housing 20 at the outside of the through-hole 20d in the radial direction and is threaded into the boss portion 21b protruding from the through-hole 20d into the rod-side movable housing 20.

A nut member (a following member) 25 is inserted into a second end 22b of the inner tube 22 and is integrally fixed to the inner tube 22.

The nut member 25 has a substantially cylindrical shape and includes a female screw groove 25n formed in the inner peripheral surface thereof. A first end of the nut member 25 is provided with a flange portion 25f which protrudes toward the outer peripheral side. The flange portion 25f regulates the movement of the nut member 25 toward the first end 22a of the inner tube 22 while being butted against a step portion 22d formed in the inner peripheral surface of the second end 22b of the inner tube 22.

(Screw Shaft and Coil Spring)

A screw shaft 60 is disposed inside the rod-side fixed housing 111. A first end portion 60a of the screw shaft 60 is held in the shaft insertion hole 116h formed in the bottom surface of the rod-side concave portion 116 to be rotatable through a bearing 61. The first end portion 60a of the screw shaft 60 protrudes into the rod-side concave portion 116 through the shaft insertion hole 116h.

The first end portion 60a of the screw shaft 60 is provided with a driven gear 64.

Further, the outer peripheral surface of the screw shaft 60 is provided with a male screw groove 60n which extends in a spiral shape. A second end portion 60b of the screw shaft 60 is inserted into the nut member 25 provided inside the second end 22b of the inner tube 22 of the rod-side movable housing 20 and the male screw groove 60n is threaded into the female screw groove 25n.

The second end portion 60b of the screw shaft 60 is provided with a stopper 65 which protrudes toward the outer periphery. The separation of the nut member 25 from the screw shaft 60 is prevented by the stopper 65.

Further, a guide tube 28 is disposed inside the rod-side fixed housing 111. The guide tube 28 is formed in a substantially cylindrical shape and the inner diameter is set to be larger than the outer diameter of the inner tube 22. A flange portion 28c which protrudes toward the outer periphery is integrally formed with a first end 28a of the guide tube 28. The guide tube 28 is disposed so that the flange portion 28c is butted against the front surface 113f of the base plate 113 of the casing 110.

The inner tube 22 is inserted into the guide tube 28 at a second end 28b.

The coil spring 70 is accommodated inside the rod-side fixed housing 111 and the rod-side movable housing 20. The coil spring 70 is formed of, for example, a metal material such as spring steel. The inner tube 22 and the guide tube 28 are disposed inside the coil spring 70. By the inner tube 22 and the guide tube 28, it is possible to prevent the coil spring 70 from flexing or buckling in the expansion/contraction direction when the coil spring 70 moves in a telescopic manner.

The coil spring 70 is provided between the bottom portion 20c of the rod-side movable housing 20 and the flange portion 28c of the guide tube 28 in a compressed state. Accordingly, the coil spring 70 is urged in a direction in which the rod-side fixed housing 111 and the rod-side movable housing 20 are separated from each other so that the entire length of the actuator 100 increases.

(Motor Portion)

Figure 5:
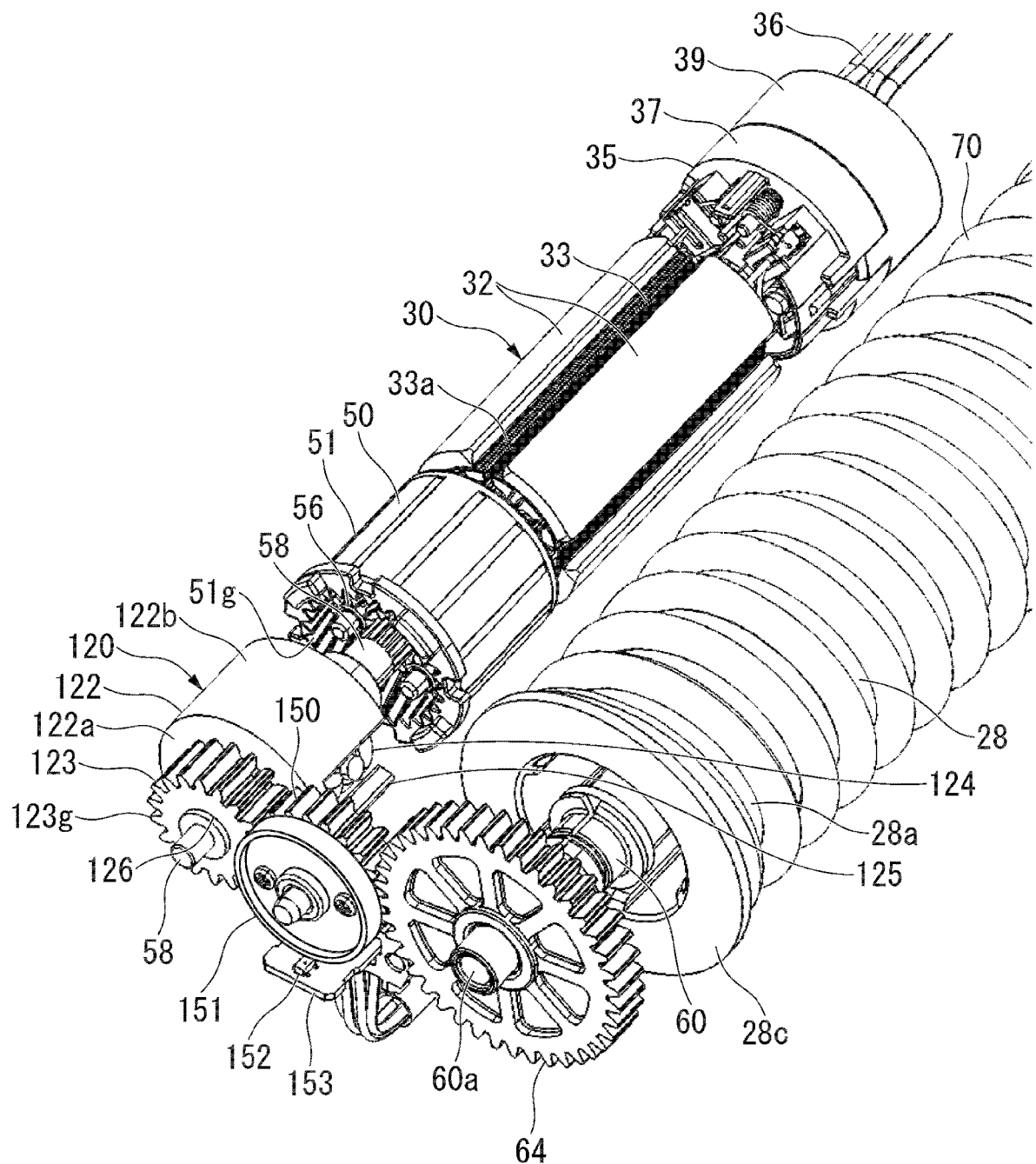
FIG. 5 is a perspective view showing a configuration of a motor, a reduction gear portion, and a torque limiter of the embodiment of the present invention.

FIG. 5 is a perspective view showing a configuration of the motor portion 30, the reduction gear portion 50, and the torque limiter 120.

As shown in FIG. 3, the motor portion 30 is accommodated inside the motor housing 112. As shown in FIG. 5, the motor portion 30 includes a yoke 31 (see FIG. 3), a magnet 32 which is fixed into the yoke 31, an armature 33 which is provided inside the yoke 31 in the radial direction so as to be rotatable, and a power supply portion 35 which supplies a current to the armature 33.

As shown in FIG. 3, the yoke 31 is formed of a metal material into a cylindrical shape and the outer diameter is smaller than the inner diameter of the motor housing 112 by a predetermined dimension. The yoke 31 is disposed inside the motor housing 112.

As shown in FIG. 5, the magnet 32 is elongated in the axial direction of the yoke 31 and is provided at a plurality of positions at intervals in the circumferential direction.

The armature 33 includes a motor shaft 34, a core 33a which is fixed to the motor shaft 34, and a coil (not shown) which is wound on the core 33a.

The motor shaft 34 is provided to be rotatable about the center axis through a bearing (not shown) and to extend in the axial direction of the yoke 31 (the motor housing 112).

The power supply portion 35 supplies a current to the armature 33. The power supply portion 35 is held by a brush holder 37 disposed at a first end 31a of the yoke 31. The power supply portion 35 includes a brush which is held by the brush holder 37 and a commutator which is provided in the motor shaft 34 and slides on the brush (none of them are shown). A wiring 36 which supplies electric power from an external power supply is connected to the brush. The commutator is electrically connected to a coil (not shown) of the armature 33.

As shown in FIG. 3, a front end portion 112b of the motor housing 112 is provided with a cap 38 which closes an opening of the front end portion 112b. A columnar packing member 39 that seals a gap between the brush holder 37 and the cap 38 is provided at the inside of the front end portion 112b of the motor housing 112. A protrusion portion 39t which protrudes outward through an opening 38h formed at the center portion of the cap 38 is integrally formed with the packing member 39.

The wiring 36 penetrates the packing member 39, passes through the protrusion portion 39t, and is derived to the outside of the motor housing 112 and the cap 38. Then, the wiring 36 is connected to a power supply portion of a battery or a generator of the vehicle body.

Such a motor portion 30 includes a sensor (not shown) for detecting the rotation position of the armature 33 inside the brush holder 37. The detector includes a sensor magnet which is integrally formed with the motor shaft 34 and a sensor such as a Hall IC (none of them are shown). When the sensor magnet rotates along with the motor shaft 34, the rotation is detected by the sensor.

In such a motor portion 30, when a current is supplied to a coil (not shown) through the power supply portion 35, the motor shaft 34 is rotationally driven about the center axis by a magnetic attractive force and a magnetic repulsive force generated between a magnetic force generated by the coil and a magnetic force generated by the magnet 32 fixed to the yoke 31.

(Reduction Gear Portion)

Figure 6:
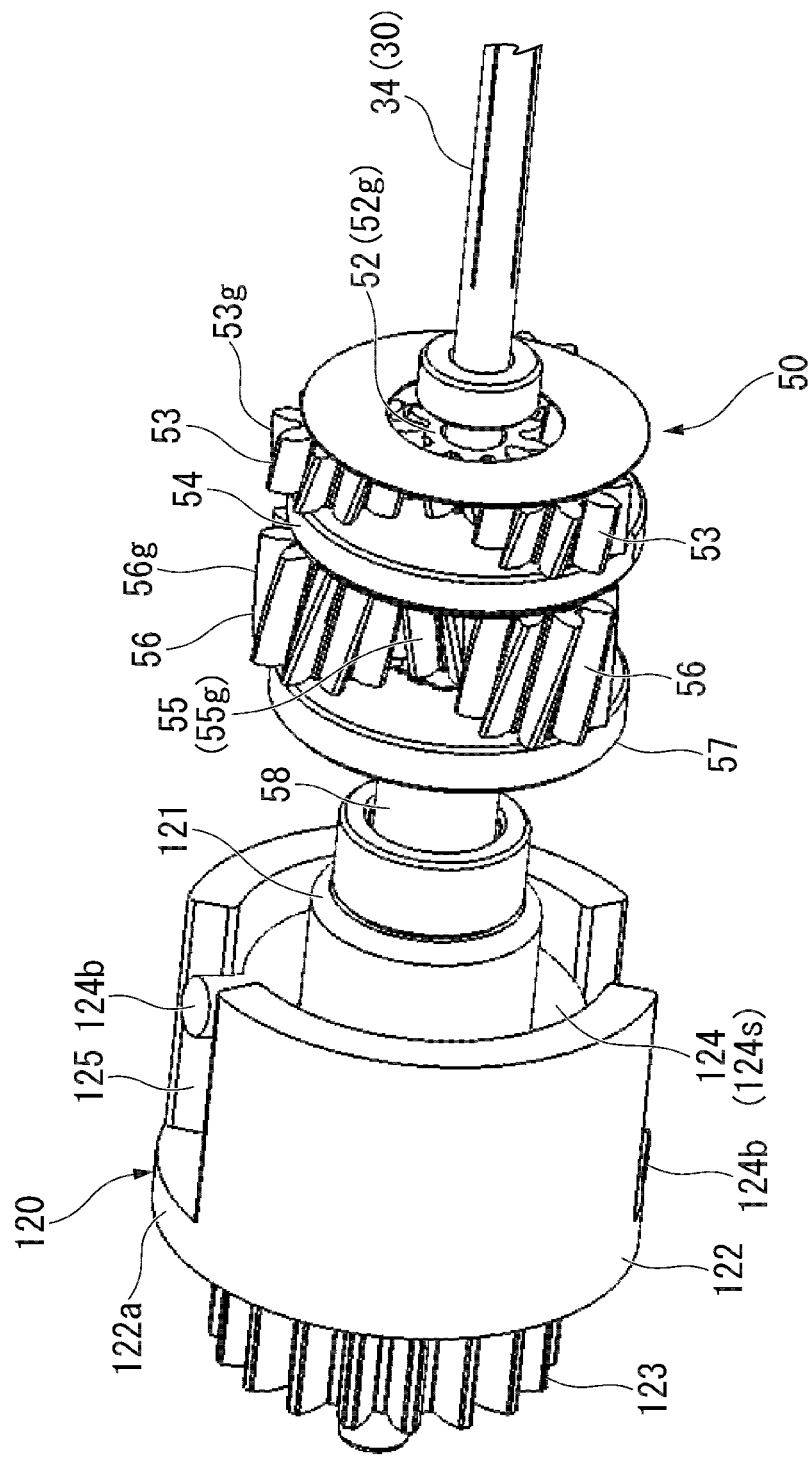
FIG. 6 is a perspective view showing a configuration of the reduction gear portion of the embodiment of the present invention.

FIG. 6 is a perspective view showing a configuration of the reduction gear portion 50.

As shown in FIG. 3, the reduction gear portion 50 is disposed in series to the motor portion 30 inside the motor housing 112. The reduction gear portion 50 is disposed at the side opposite to the power supply portion 35 of the motor portion 30.

As shown in FIGS. 5 and 6, the reduction gear portion 50 includes an internal gear 51, a first sun gear 52, a first stage planetary gear 53, a first carrier 54, a second sun gear 55, a second stage planetary gear 56, and a second carrier 57.

As shown in FIG. 3, the internal gear 51 is provided inside a second end 31b of the yoke 31 so as not to be rotatable. The internal gear 51 is formed in a substantially cylindrical shape and the inner peripheral surface is provided with gear teeth 51g (see FIG. 5).

As shown in FIG. 6, the first sun gear 52 is fitted to the motor shaft 34 and the outer peripheral surface is provided with gear teeth 52g.

For example, the first stage planetary gear 53 is provided at three positions of the outer peripheral portion of the first sun gear 52. The outer peripheral surface of each first stage planetary gear 53 is provided with gear teeth 53g which engage with the gear teeth 52g of the first sun gear 52 and the gear teeth 51g of the internal gear 51.

The first carrier 54 is formed in a substantially disk shape and is disposed on the plurality of first stage planetary gears 53 to be located at a position opposite to the motor shaft 34. Further, a support shaft (not shown) is assembled to the first carrier 54. The support shaft is formed in a substantially disk shape and supports the first stage planetary gear 53 to be rotatable.

The second sun gear 55 is integrally formed with the center portion of the first carrier 54 to be located at a position opposite to the motor shaft 34. The outer peripheral surface of the second sun gear 55 is provided with gear teeth 55g.

For example, three second stage planetary gears 56 are provided in the outer peripheral portion of the second sun gear 55. The outer peripheral surface of each second stage planetary gear 56 is provided with gear teeth 56g which engage with the gear teeth 55g of the second sun gear 55 and the gear teeth 51g of the internal gear 51.

The second carrier 57 is disposed on the plurality of second stage planetary gears 56 to be located at a position opposite to the motor portion 30. The second carrier 57 is formed in a disk shape such that a support shaft (not shown) supporting the second stage planetary gear 56 to be rotatable is assembled.

The first sun gear 52 and the second sun gear 55 are respectively formed of a metal material such as a sintered material and the first carrier 54 and the second carrier 57 are also formed of a metal material. Further, the internal gear 51, the first stage planetary gear 53, and the second stage planetary gear 56 are respectively formed of a resin material.

Further, each of the gear teeth 51g of the internal gear 51, the gear teeth 52g of the first sun gear 52, the gear teeth 53g of the first stage planetary gear 53, the gear teeth 55g of the second sun gear 55, and the gear teeth 56g of the second stage planetary gear 56 is configured as a helical gear. Accordingly, it is possible to reduce operating noise by increasing an engagement margin between the gears of the reduction gear portion 50.

In such a reduction gear portion 50, when the motor shaft 34 is rotated by the motor portion 30, the first sun gear 52 rotates together with the motor shaft 34. The rotation of the first sun gear 52 is transmitted to the first stage planetary gear 53 of the outer peripheral side thereof. Each first stage planetary gear 53 moves in a so-called planetary motion to revolve around the outer peripheral portion of the first sun gear 52 and to rotate about the support shaft assembled to the first carrier 54 while engaging with the gear teeth 52g of the first sun gear 52 and the gear teeth 51g of the internal gear 51 of the outer peripheral side.

In accordance with the planetary motion of the plurality of first stage planetary gears 53, the first carrier 54 rotates about the same axis as that of the motor shaft 34 in a deceleration state.

When the first carrier 54 rotates, the second sun gear 55 rotates together so that the rotation is transmitted to the second stage planetary gear 56 of the outer peripheral side thereof. Each second stage planetary gear 56 performs a so-called planetary motion to revolve around the outer peripheral portion of the second sun gear 55 and to rotate about the support shaft assembled to the second carrier 57 while engaging with the gear teeth 55g of the second sun gear 55 and the gear teeth 51g of the internal gear 51 of the outer peripheral side.

In accordance with the planetary motion of the plurality of second stage planetary gears 56, the second carrier 57 rotates about the same axis as that of the motor shaft 34 in a deceleration state.

The drive shaft 58 is connected to the second carrier 57 of the reduction gear portion 50 through a gear. The drive shaft 58 is provided in the second carrier 57 to extend in a direction opposite to the motor shaft 34. As shown in FIG. 3, the drive shaft 58 protrudes into the torque limiter accommodation concave portion 115 while passing through the shaft insertion hole 115*h* formed in the base plate 113.

(Torque Limiter)

Figure 7:
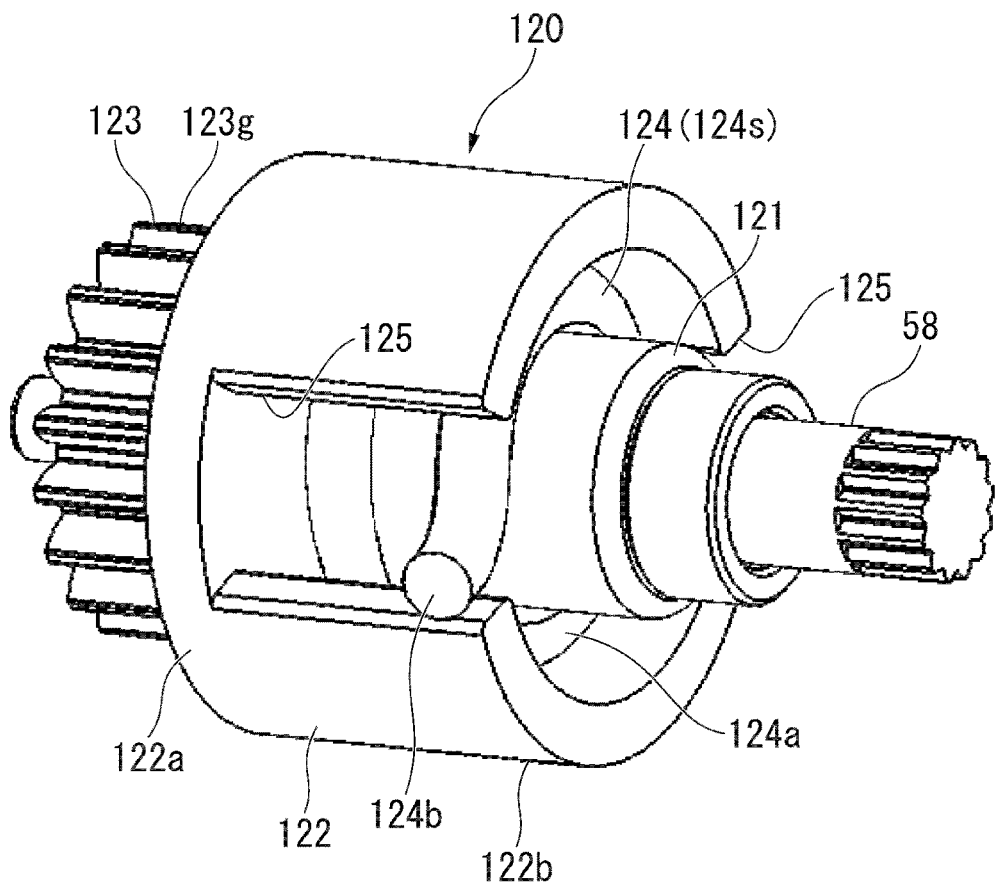
FIG. 7 is a perspective view showing a configuration of the torque limiter of the embodiment of the present invention.
Figure 8:
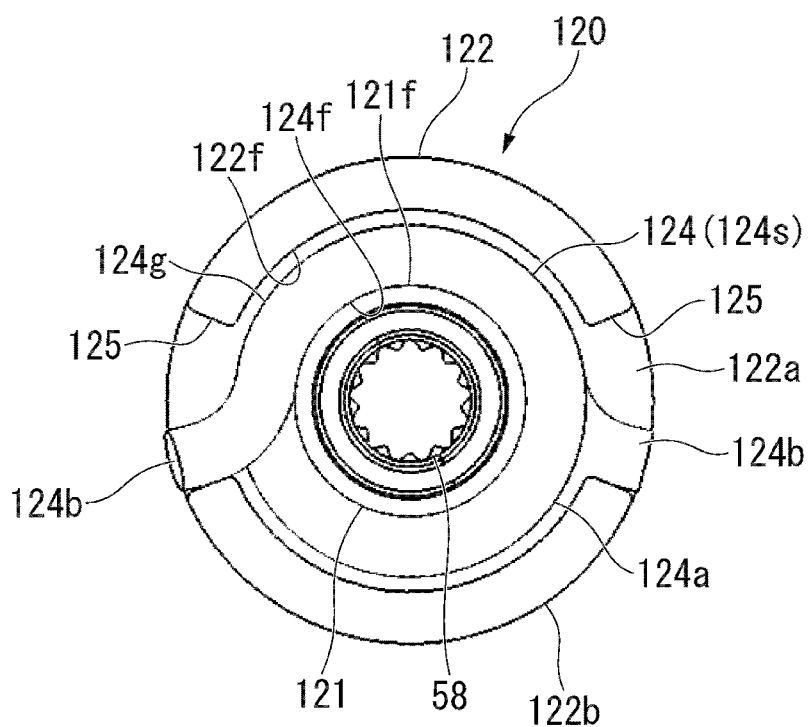
FIG. 8 is a diagram showing the torque limiter of the embodiment of the present invention from an axial direction of an inner shaft.

FIG. 7 is a perspective view showing a configuration of the torque limiter 120 of the embodiment of the present invention. FIG. 8 is a diagram showing the torque limiter 120 of the embodiment of the present invention from the axial direction of an inner shaft 121.

The torque limiter 120 is disposed inside the torque limiter accommodation concave portion 115 formed in the base plate 113.

As shown in FIGS. 6 to 8, the torque limiter 120 includes an inner shaft 121 which is provided in the drive shaft 58, an outer member 122 that is provided at the outside of the drive shaft 58 in the radial direction, a drive gear 123 which is disposed at a first end of the outer member 122, and a coil spring 124 which is disposed inside the outer member 122.

The inner shaft 121 is formed inside the torque limiter accommodation concave portion 115 of the drive shaft 58. The inner shaft 121 is formed in a substantially columnar shape to extend along the center axis of the drive shaft 58 and the outer diameter is larger than the outer diameter of the drive shaft 58.

Meanwhile, the outer member 122 integrally includes a plate portion (a bottom portion) 122*a* and a cylindrical portion 122*b*.

The plate portion 122*a* is formed in a substantially disk shape and is located within a plane orthogonal to the center axis of the drive shaft 58. The cylindrical portion 122*b* is formed in a substantially cylindrical shape and extends from the outer peripheral portion of the plate portion 122*a* toward the reduction gear portion 50. Further, the inner diameter of the cylindrical portion 122*b* is set to be larger than the outer diameter of the inner shaft 121 by a predetermined dimension. Then, a substantially annular gap is formed between the inner peripheral surface of the cylindrical portion 122*b* and the outer peripheral surface of the inner shaft 121. Further, slits 125 and 125 which extend in the axial direction of the drive shaft 58 are formed at two positions of the cylindrical portion 122*b* with a gap therebetween in the circumferential direction.

As shown in FIGS. 5 and 6, the drive gear 123 is integrally formed with a surface opposite to the cylindrical portion 122*b* in the plate portion 122*a* of the outer member 122. The outer peripheral surface of the drive gear 123 is provided with gear teeth 123*g*.

As shown in FIGS. 5 and 7, a shaft insertion hole 126 is formed at the center portion between the drive gear 123 and the plate portion 122*a* in the outer member 122 integrally formed with the drive gear 123. The drive shaft 58 is inserted through the shaft insertion hole 126. Then, the outer member 122 and the drive gear 123 are relatively rotatable about the center axis of the drive shaft 58.

As shown in FIGS. 6 to 8, the coil spring 124 is configured as a wire 124*s* which is formed of, for example, spring steel or the like. The coil spring 124 includes a coil portion 124*a* in which the wire 124*s* is wound in a spiral shape and both end portions 124*b* and 124*b* of the wire 124*s* which extend from the coil portion 124*a* and protrude outward in the radial direction.

Such a coil spring 124 is accommodated in a gap between the inner shaft 121 and the outer member 122. The coil spring 124 is provided such that both end portions 124*b* and 124*b* are locked to the slits 125 and 125 formed in the cylindrical portion 122*b* of the outer member 122.

In such a torque limiter 120, an inner peripheral surface 124*f* of the coil portion 124*a* of the coil spring 124 comes into close contact with an outer peripheral surface 121*f* of the inner shaft 121 in a normal state. Further, a clearance is formed between an outer peripheral surface 124*g* of the coil portion 124*a* and an inner peripheral surface 122*f* of the outer member 122. Accordingly, when the rotation of the motor shaft 34 of the motor portion 30 is transmitted to the drive shaft 58 through the reduction gear portion 50, the coil spring 124 rotates together with the drive shaft 58 by a frictional force generated between the coil spring 124 and the inner shaft 121.

The rotation of the coil spring 124 is transmitted to the outer member 122 through the locking portions of both end portions 124*b* and 124*b* of the coil spring 124 and the slits 125 and 125. Accordingly, the drive gear 123 which is integrally formed with the outer member 122 rotates.

Furthermore, the elastic modulus or the like of the coil spring 124 is set so that the close contact state between the coil portion 124*a* and the outer peripheral surface 121*f* of the inner shaft 121 is maintained even when the drive shaft 58 is rotated in any direction (a direction in which the tailgate 2 is opened or closed) by the motor portion 30 as long as the actuator 100 is normally operated.

In contrast, if a force is applied from the drive gear 123 in a direction opposite to the rotation direction of the drive gear 123 (the rotation direction by the driving of the motor portion 30), that is, a direction in which the rotation of the drive gear 123 is stopped when the drive gear 123 rotates by the driving of the motor portion 30, the force is transmitted to both end portions 124*b* and 124*b* of the coil spring 124 through the slits 125 and 125 formed in the cylindrical portion 122*b* of the outer member 122.

When a torque generated by a force input from the outer member 122 in the opposite direction becomes equal to or larger than a predetermined torque determined by the elastic modulus or the like of the coil spring 124, the outer diameter of the coil spring 124 is enlarged while the coil portion 124*a* is loosened.

Then, the inner peripheral surface 124*f* of the coil portion 124*a* of the coil spring 124 moves outward in the radial direction from the outer peripheral surface 121*f* of the inner shaft 121 so that a frictional force between the inner shaft 121 and the outer member 122 disappears. As a result, the rotational force is not transmitted between the drive shaft 58 and the coil spring 124. Accordingly, a slippage occurs between the drive gear 123 and the drive shaft 58 rotationally driven by the motor portion 30.

As shown in FIGS. 3 and 5, the drive gear 123, the driven gear 64 provided at a first end portion 60*a* of the screw shaft 60, and the intermediate gear 150 provided between the drive gear 123 and the driven gear 64 are provided to engage with one another in the joint surface 113*g* of the base plate 113 of the casing 110.

A sensor magnet 151 is integrally attached to the intermediate gear 150.

Figure 9:
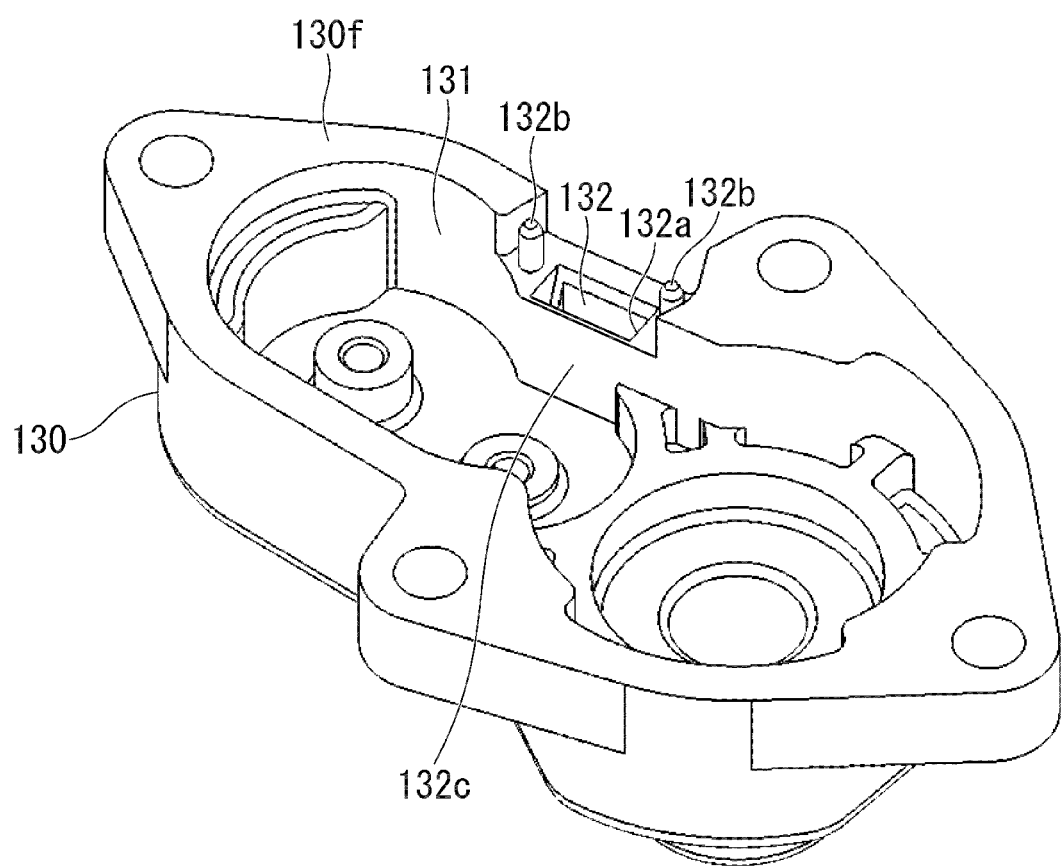
FIG. 9 is a perspective view showing a gear casing of the embodiment of the present invention.
Figure 10:
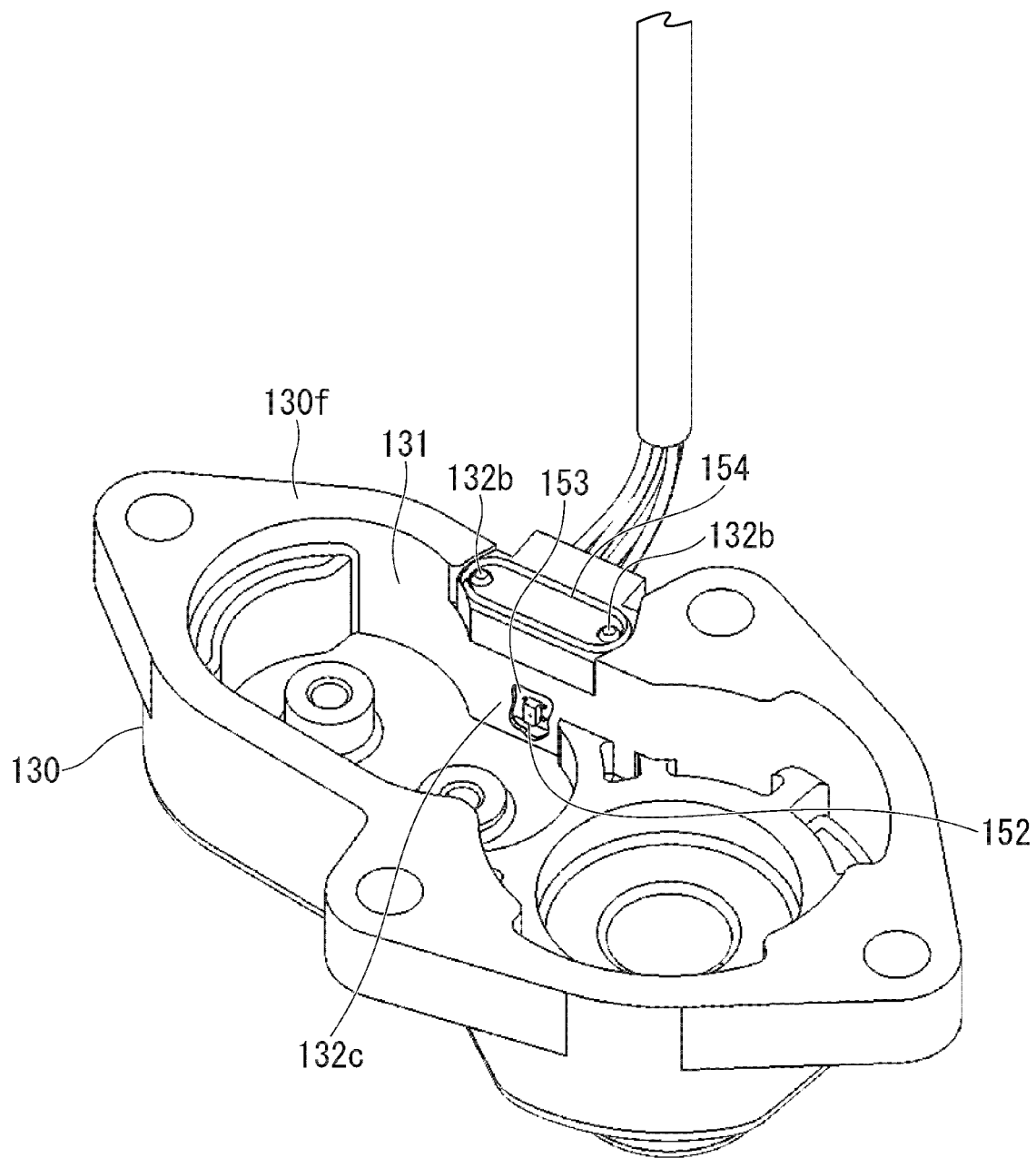
FIG. 10 is a perspective view showing a state in which a sensor board is attached to the gear casing of the embodiment of the present invention.

FIG. 9 is a perspective view showing the gear casing 130. FIG. 10 is a perspective view showing a state in which a sensor board 153 is attached to the gear casing 130 and a position corresponding to a sensor element 152 is notched.

As shown in FIG. 3, the gear casing 130 is attached to the joint surface 113g of the base plate 113 of the casing 110.

As shown in FIG. 9, the gear casing 130 includes a gear accommodation concave portion 131 which is provided in an opposite surface 130f facing the joint surface 113g of the base plate 113 to be recessed in a direction moving away from the joint surface 113g. The gear accommodation concave portion 131 accommodates the drive gear 123, the driven gear 64, and the intermediate gear 150 while the opposite surface 130f of the gear casing 130 faces the joint surface 113g of the base plate 113.

Further, an inner peripheral surface 131s of the gear accommodation concave portion 131 of the gear casing 130 is provided with a sensor accommodation concave portion 132.

As shown in FIG. 10, the sensor accommodation concave portion 132 holds the sensor board 153 provided with the sensor element 152 such as a Hall IC. The sensor accommodation concave portion 132 includes a guide groove 132a which guides the insertion direction of the sensor board 153, fixed pins 132b and 132b which are inserted into a holder portion 154 provided in the sensor board 153, and a wall portion 132c which prevents grease applied to the drive gear 123, the driven gear 64, and the intermediate gear 150 from being scattered to the sensor accommodation concave portion 132.

The sensor accommodation concave portion 132 is formed to extend in the same direction as that of the gear accommodation concave portion 131. The sensor board 153 is attached to the sensor accommodation concave portion 132 to be inserted from the opposite surface 130f in a direction moving away from the joint surface 113g.

Further, the gear casing 130 is provided with a joint member 135 that is provided at the side opposite to the casing 110 to be connected to the bracket 6 provided in the vehicle body 1 through a pin (not shown).

As shown in FIG. 5, the sensor board 153 which is held by the sensor accommodation concave portion 132 is disposed so that the sensor element 152 faces the sensor magnet 151 provided in the intermediate gear 150 from the outside in the radial direction. When the sensor magnet 151 rotates together with the intermediate gear 150, the sensor element 152 detects the rotation by detecting a change in magnetic flux of the sensor magnet 151.

(Operation of Vehicle Door Opening and Closing Actuator)

Next, an operation of the actuator 100 will be described.

When the motor shaft 34 of the motor portion 30 is rotationally driven to open and close the tailgate 2, the rotation of the motor shaft 34 is transmitted to the drive shaft 58 through the reduction gear portion 50. The rotation of the drive shaft 58 is transmitted to the drive gear 123 through the torque limiter 120.

In this case, as described above, no slippage occurs due to a frictional force generated between the coil portion 124a of the coil spring 124 of the torque limiter 120 and the inner shaft 121 provided in the drive shaft 58 as long as there is no excessive input from the tailgate 2. Accordingly, the rotation of the drive shaft 58 is transmitted to the drive gear 123 integrally formed with the outer member 122 without any loss through the coil spring 124.

The rotation of the drive gear 123 is transmitted to the driven gear 64 through the intermediate gear 150. When the driven gear 64 rotates, the screw shaft 60 rotates together. Accordingly, the nut member 25 moves in the axial direction of the screw shaft 60. Since the nut member 25 is fixed to the inner tube 22 integrated with the rod-side movable housing 20, the rod-side movable housing 20 protrudes and retracts with respect to the rod-side fixed housing 111 so that the actuator 100 expands and contracts.

When the rod-side movable housing 20 moves in a direction protruding with respect to the rod-side fixed housing 111 by the driving of the motor portion 30, the tailgate 2 provided in the opening portion 3 of the vehicle body 1 is closed. Further, when the rod-side movable housing 20 moves in a direction protruding and retracting with respect to the rod-side fixed housing 111 by the driving of the motor portion 30, the tailgate 2 provided in the opening portion 3 of the vehicle body 1 is opened. At this time, a state in which the rod-side movable housing 20 protrudes with respect to the rod-side fixed housing 111 is maintained by the urging force of the coil spring 70 even when the operation of the motor portion 30 is stopped while the actuator 100 expands.

When the tailgate 2 is opened and closed with an external force more than expected while the tailgate 2 is opened, the nut member 25 provided in the rod-side movable housing 20 forcedly rotates the screw shaft 60. The rotation of the screw shaft 60 is transmitted to the drive gear 123 through the driven gear 64 and the intermediate gear 150 so that a rotational force acts on the torque limiter 120.

Further, the movement of the nut member 25 along the screw shaft 60 with the driving of the motor portion 30 is forcedly stopped even when an operation in which the rod-side movable housing 20 protrudes and retracts is disturbed when the tailgate 2 which is being opened and closed collides with a peripheral obstacle. Then, the rotation of the screw shaft 60 and the driven gear 64 is stopped and a force generated in a direction opposite to the drive shaft 58 by the motor portion 30 is applied from the drive gear 123 to the torque limiter 120 through the driven gear 64 and the intermediate gear 150.

In this way, when a force is input from the drive gear 123 to the torque limiter 120, the force is transmitted to both end portions 124b and 124b of the coil spring 124 through the slits 125 and 125 formed in the cylindrical portion 122b of the outer member 122.

When a torque generated by an input force is equal to or larger than a predetermined torque determined by the elastic modulus or the like of the coil spring 124, the coil spring 124 is deformed in a direction in which the outer diameter is widened since the coil portion 124a is loosened. Then, the inner peripheral surface 124f of the coil portion 124a of the coil spring 124 moves outward in the radial direction from the outer peripheral surface 121f of the inner shaft 121. As a result, the transmission of the rotational force through the coil spring 124 does not occur between the inner shaft 121 and the outer member 122.

Accordingly, so-called slippage occurs between the drive gear 123 and the drive shaft 58 rotationally driven by the motor portion 30. Then, an excessive force applied to the tailgate 2 is not input to the reduction gear portion 50 or the motor portion 30. Thus, it is possible to prevent an excessive force from being input to an engagement portion among the reduction gear portion 50 or the motor portion 30, the drive gear 123, the intermediate gear 150, and the driven gear 64. Further, it is possible to prevent an excessive force from being input to a connection portion or the like between the actuator 100 and the tailgate 2 or the vehicle body 1.

Incidentally, when the tailgate 2 is opened and closed by the extraction and contraction of the actuator 100 with the driving of the motor portion 30, the sensor element 152 detects the rotation of the intermediate gear 150 by detecting a change in magnetic flux of the sensor magnet 151. Accordingly, a controller (not shown) provided in the vehicle body 1 recognizes the opening and closing angle of the tailgate 2 in order to control the operation of the actuator 100.

Here, the sensor magnet 151 and the sensor element 152 are provided near the screw shaft 60 in relation to the torque limiter 120 including the coil spring 124 and enabling and disabling the transmission of the torque transmitted between the motor portion 30 and the screw shaft 60. For this reason, even when the torque limiter 120 functions due to an excessive input from the screw shaft 60 and slippage occurs between the drive gear 123 and the drive shaft 58 rotationally driven by the motor portion 30, the opening and closing angle of the tailgate 2 recognized by the controller (not shown) is not influenced. Thus, the tailgate 2 which is a driving target by the actuator 10 can be continuously driven by the torque limiter 120 from a state before slippage occurs after an excessive input is cancelled.

In this way, the torque limiter 120 includes the coil spring 124 and the inner shaft 121 which is connected to the drive shaft 58 and is disposed to be inserted into the coil portion 124a of the coil spring 124. Further, the torque limiter 120 includes the bottomed cylindrical outer member 122 that is disposed at the outside of the coil portion 124a with a gap interposed therebetween and to which both end portions 124b and 124b of the wire 124s forming the coil spring 124 are locked. Further, the torque limiter 120 includes the drive gear 123 which is integrally formed with the plate portion 122a of the outer member 122. Then, when a torque equal to or larger than a predetermined torque value is applied from the outer member 122 to the coil portion 124a due to an external force input from the screw shaft 60, the coil portion 124a of the coil spring 124 becomes loosened in a direction in which the inner diameter of the coil portion 124a is enlarged.

For this reason, when a force is applied from the screw shaft 60, a relative rotation is about to occur between the inner shaft 121 connected to the drive shaft 58 of the motor portion 30 and the outer member 122 connected to the screw shaft 60 through the drive gear 123. When a torque applied to the coil portion 124a of the coil spring 124 becomes equal to or larger than a predetermined torque value determined by the elastic modulus or the like of the coil spring 124 due to the relative rotation, the coil portion 124a becomes loosened in a direction in which the inner diameter is enlarged. When the coil portion 124a is enlarged outward in the radial direction, the coil portion 124a is separated from the inner shaft 121. As a result, a rotational force is not transmitted between the coil portion 124a of the coil spring 124 and the inner shaft 121 rotating together with the drive shaft 58 of the motor portion 30 and slippage occurs between the inner shaft 121 and the outer member 122. Accordingly, it is possible to interrupt the transmission of an input force to the motor portion 30 when an excessive force is input from the screw shaft 60.

In such a configuration, since the drive gear 123 is integrally formed with the outer member 122, a member or the like connecting the drive gear 123 and the outer member 122 is not necessary. Thus, it is possible to prevent an increase in size, cost, and weight of components by improving performance in response to an excessive input by the torque limiter 120.

Further, the actuator 100 includes the torque limiter 120, the motor portion 30 rotating the drive shaft 58, the screw shaft 60 rotationally driven by the transmission of the rotation of the drive shaft 58, and the nut member 25 moving in the axial direction of the screw shaft 60 with the rotation of the screw shaft 60. For this reason, if an excessive force is applied from the nut member 25 when the tailgate 2 is suddenly opened and closed by an external force or the tailgate 2 which is being opened and closed collides with a peripheral obstacle, the coil portion 124a is enlarged outward in the radial direction to be separated from the inner shaft 121. As a result, a rotational force is not transmitted between the inner shaft 121 and the coil spring 124. Thus, it is possible to interrupt the transmission of the input force to the motor portion 30 when an excessive force is input from the nut member 25.

Further, in the actuator 100, the motor portion 30 is disposed in parallel to the rod-side fixed housing 111 and the rod-side movable housing 20. For this reason, it is possible to shorten the entire length of the actuator 100 as compared with a case in which the motor portion 30 is disposed in series to the rod-side fixed housing 111 and the rod-side movable housing 20.

Further, the actuator 100 further includes the casing 110 which integrally includes the motor housing 112 accommodating the motor portion 30, the rod-side fixed housing 111, and the base plate 113 connected to the base end portion of the motor housing 112 and the base end portion of the rod-side fixed housing 111. For this reason, since the motor housing 112 and the rod-side fixed housing 111 are integrated with each other through the base plate 113, the number of components can be decreased.

Further, the actuator 100 includes the drive gear 123, the driven gear 64 provided in the screw shaft 60, and the intermediate gear 150 provided between the drive gear 123 and the driven gear 64. Then, the drive gear 123, the driven gear 64, and the intermediate gear 150 are disposed in the base plate 113 to be located at a position opposite to the motor housing 112 and the rod-side fixed housing 111.

For this reason, the screw shaft 60 can be rotated by transmitting the rotation of the drive gear 123 driven by the motor portion 30 to the driven gear 64 through the intermediate gear 150. Further, since the intermediate gear 150 is interposed between the drive gear 123 and the driven gear 64, it is possible to decrease the diameters of the drive gear 123 and the driven gear 64 as compared with a configuration in which the drive gear 123 and the driven gear 64 directly engage with each other when the same torque as that of this configuration is output.

Further, the actuator 100 includes the sensor magnet 151 which is provided in the intermediate gear 150 and the sensor element 152 which detects a change in magnetic flux of the sensor magnet 151. That is, the sensor magnet 151 and the sensor element 152 are provided near the screw shaft 60 in relation to the coil spring 124 that enables and disables the transmission of the torque transmitted between the motor portion 30 and the screw shaft 60. Accordingly, it is possible to continuously drive the tailgate 2 which is a driving target by the actuator 10 from a state before slippage occurs after an excessive input is cancelled when the coil portion 124a of the coil spring 124 is enlarged due to an excessive input from the screw shaft 60 so that slippage occurs between the inner shaft 121 and the outer member 122.

Further, the sensor magnet 151 is provided in the intermediate gear 150 and the sensor element 152 is disposed at the outside of the intermediate gear 150 in the radial direction. For this reason, it is possible to prevent the sensor element 152 from interfering with the drive shaft 58 of the motor portion 30 connected to the drive gear 123 or the screw shaft 60 connected to the driven gear 64. Accordingly, it is possible to prevent an increase in size of the actuator 100 by providing the sensor element 152.

Further, the actuator 100 further includes the gear casing 130 which is provided at a position opposite to the motor housing 112 and the rod-side fixed housing 111 in the base plate 113 and covers the drive gear 123, the driven gear 64, and the intermediate gear 150. Further, the gear casing 130 includes the gear accommodation concave portion 131 which accommodates the drive gear 123, the driven gear 64, and the intermediate gear 150 and the sensor accommodation concave portion 132 which accommodates the sensor element 152. Then, the gear accommodation concave portion 131 and the sensor accommodation concave portion 132 are opened in the same direction.

For this reason, when the gear casing 130 is formed such that the gear accommodation concave portion 131 accommodates the drive gear 123, the driven gear 64, and the intermediate gear 150 and the sensor accommodation concave portion 132 accommodates the sensor element 152, the drive gear 123, the driven gear 64, and the intermediate gear 150 can be assembled from the same direction as that of the sensor element 152. Thus, workability and assembling workability can be improved.

Other Embodiments

Furthermore, the present invention is not limited to the above-described embodiment and various modifications of the above-described embodiment are included in a scope which does not deviate from the gist of the present invention.

For example, the configuration of each unit of the actuator 100 can be appropriately changed within the known scope of the present invention. As an example, in the above-described embodiment, the intermediate gear 150 is provided between the drive gear 123 and the driven gear 64. However, the present invention is not limited thereto and the actuator 100 may include a plurality of intermediate gears so that the drive gear 123 and the driven gear 64 directly engage with each other while the intermediate gear 150 is eliminated.

Further, in the above-described embodiment, the rod-side fixed housing 111 and the rod-side movable housing 20 are disposed in parallel to the motor portion 30. However, the present invention is not limited thereto and the rod-side fixed housing 111 and the rod-side movable housing 20 can be disposed in series to the motor portion 30. Also in this case, since the torque limiter 120 is provided, the same effect as that of the above-described embodiment is obtained.

Further, in the above-described embodiment, a case in which the actuator 100 is provided between the roof outer panel 4*a* and the roof inner panel 4*b* constituting the ceiling of the vehicle body 1 has been described. However, the present invention is not limited thereto and the actuator may be provided at the side frame portions on both sides of the opening portion 3.

Further, in the above-described embodiment, a case in which the intermediate gear 150 is provided with the sensor magnet 151 has been described. However, the present invention is not limited thereto and at least one of the outer member 122, the drive gear 123, the intermediate gear 150, the driven gear 64, and the screw shaft 60 may be provided with the sensor magnet 151.

Further, the application of the actuator 100 is not limited to the application for opening and closing the tailgate 2 and the actuator can be used to open and close various opening and closing members such as a door, a bonnet hood, and a filler opening flap provided in various opening portions formed in the vehicle to be openable and closeable. Further, the actuator 100 is not limited to the application for the vehicle and can also be applied to other applications.

Besides, it is possible to select the configuration described in the above-described embodiment or to appropriately change the configuration to another configuration without deviating from the gist of the present invention.

INDUSTRIAL APPLICABILITY

According to the power transmission mechanism, the actuator, and the vehicle actuator, it is possible to improve performance in response to an excessive input and to prevent an increase in the size, cost, and weight of components.

REFERENCE SIGNS LIST

1 Vehicle body
2 Tailgate (opening and closing member)
3 Opening portion
20 Rod-side movable housing (movable housing)
25 Nut member (following member)
30 Motor portion (motor)
58 Drive shaft
60 Screw shaft (driven shaft)
64 Driven gear
70 Coil spring
100 Actuator (vehicle actuator)
110 Casing
111 Rod-side fixed housing (fixed housing)
112 Motor housing
113 Base plate
120 Torque limiter (power transmission mechanism)
121 Inner shaft
122 Outer member
122*a* Plate portion (bottom portion)
123 Drive gear
124 Coil spring
124*a* Coil portion
124*b* End portion
124*s* Wire
130 Gear casing (cover)
131 Gear accommodation concave portion
132 Sensor accommodation concave portion
150 Intermediate gear
151 Sensor magnet
152 Sensor element

What is claimed is:

1. An actuator comprising:
a power transmission mechanism which is interposed between a motor rotating a drive shaft and a driven shaft rotationally driven by the transmission of the rotation of the drive shaft, comprising:
 a coil spring;
 an inner shaft which is connected to the drive shaft and is disposed to be inserted into a coil portion of the coil spring so that the coil portion of the coil spring is configured to come into close contact with an outer peripheral surface thereof;
 a bottomed cylindrical outer member that is disposed at the outside of the coil portion with a gap interposed therebetween and is provided to be relatively rotatable with respect to the inner shaft so that both end portions of a wire forming the coil spring are locked thereto; and
 a drive gear which is integrally formed with a bottom portion of the outer member and is configured to transmit a rotational force to the driven shaft, wherein when a torque equal to or larger than a predetermined torque value is applied from the outer member to the coil portion by an external force input from the driven shaft, the coil portion of the coil spring becomes loosened in a direction in which an inner diameter of the coil portion is enlarged;

a following member that is configured to move in an axial direction of the driven shaft with the rotation of the driven shaft;

a fixed housing which is formed in a cylindrical shape and accommodates the driven shaft;

a movable housing which has an outer diameter smaller than an inner diameter of the fixed housing, is inserted into the fixed housing, and is provided in a protruding and retracting direction from the fixed housing with the movement of the following member, wherein the motor is disposed in parallel to the fixed housing and the movable housing;

a casing which integrally includes a motor housing accommodating the motor, the fixed housing, and a base plate connected to a base end portion of the motor housing and a base end portion of the fixed housing;

a driven gear which is provided in the driven shaft; and an intermediate gear which is provided between the drive gear and the driven gear, wherein the drive gear, the driven gear, and the intermediate gear are disposed in the base plate to be located at a position opposite to the motor housing and the fixed housing.

2. The actuator according to claim 1, further comprising:

a sensor magnet which is provided in at least one of the outer member, the drive gear, the intermediate gear, the driven gear, and the driven shaft; and a sensor element which is configured to detect a change in magnetic flux of the sensor magnet.

3. The actuator according to claim 2, wherein the sensor magnet is provided in the intermediate gear, and wherein the sensor element is disposed at the outside of the intermediate gear in a radial direction.

4. The actuator according to claim 3, further comprising:

a cover which is provided at a position opposite to the motor housing and the fixed housing in the base plate and covers the drive gear, the driven gear, and the intermediate gear, wherein the cover includes a gear accommodation concave portion which accommodates the drive gear, the driven gear, and the intermediate gear and a sensor accommodation portion which accommodates the sensor element, and wherein the gear accommodation concave portion and the sensor accommodation portion are opened in the same direction.

5. A vehicle actuator comprising:

the actuator according to claim 1 which is mounted to a vehicle and opens and closes an opening and closing member provided in an opening portion formed in the vehicle to be openable and closeable.

* * * * *